Dec. 13, 1949     G. A. TINNERMAN     2,491,290
CLAMPING DEVICE FOR SUPPORTING A BUNDLE OF WIRES
Filed April 3, 1945
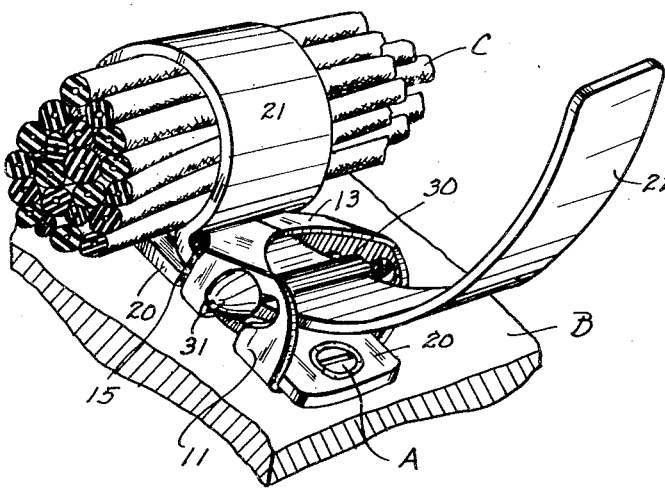
FIG. 1
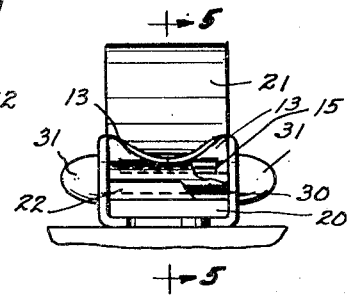
FIG. 2
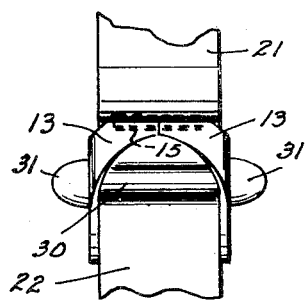
FIG. 3
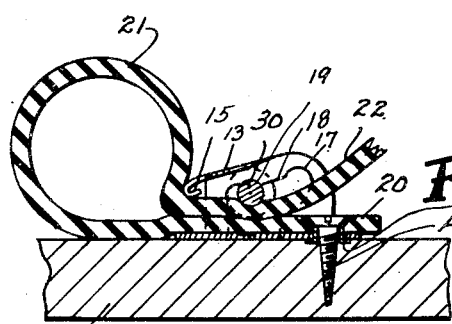
FIG. 5
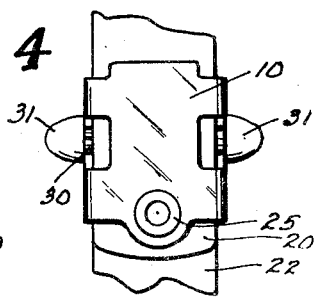
FIG. 4
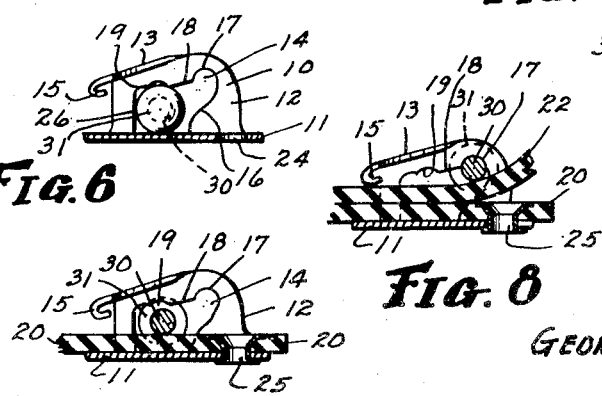
FIG. 6    FIG. 8
FIG. 7
Inventor
GEORGE A. TINNERMAN
By Bates, Teare, & McKean
Attorneys Patented Dec. 13, 1949

2,491,290

UNITED STATES PATENT OFFICE 2,491,290

CLAMPING DEVICE FOR SUPPORTING A BUNDLE OF WIRES

George A. Tinnerman, Cleveland, Ohio, assignor to Tinnerman Products, Inc., Cleveland, Ohio, a corporation of Ohio Application April 3, 1945, Serial No. 586,301

5 Claims. (Cl. 24—73)

This invention relates to a clamping device adapted to hold objects of various sizes on a suitable support. The general object of the invention is to provide such a device which may embrace the object to be attached irrespective of the size thereof (within the range of the device) in a minimum of time and firmly hold the object in place while allowing its ready release whenever desired.

My invention is well adapted for holding in place a bundle of insulated wires such as used for instance in airplane work. To this end I provide a strap adapted to be placed around a bundle of wires and having one end attached to the support, and I provide a very simple and effective device for movably holding the free end portion of the strap and allowing it to be drawn taut about the wires or other object, and the clamp is tightly in position to retain the embraced object in place.

Another object of the invention is to so construct the device which clamps the strap that the mere backward movement of the projecting free end of the strap may operate the clamping member thereof to lock the strap in its tightly drawn position.

Other features contributing to the efficiency of my device and included within my invention will become apparent from the following detailed description of a preferred embodied illustrated in the drawings.

In the drawings, Fig. 1 is a perspective of my clamping device attached to a suitable support and embracing a bundle of insulated wires; Fig. 2 is a rear elevation of the clamping device on the support, but without the wires or other object clamped; Fig. 3 is a plan of the clamping device; Fig. 4 is a bottom plan of the clamping device; Fig. 5 is a cross section through the clamping device in mounted position as indicated by the line 5—5 in Fig. 2; Fig. 6 is a cross section in the same plane as Fig. 5 of the strap holding device without the strap; Fig. 7 is a cross section in the plane of Fig. 5 showing the device after the strap has been attached thereto and ready for mounting on the support; Fig. 8 is a cross section in the plane of Fig. 5 showing the clamping device with the attached or anchored portion of the strap therein and a part of the free portion of the strap in position to be clamped by the device.

My device comprises briefly a retaining housing 10, a flexible strap 20 secured thereto near one end of the strap, and a clamping member 30 slidably mounted in the housing and adapted to lock the free portion of the strap.

The housing 10 is preferably made of a single piece of sheet metal bent to provide a base portion 11, two parallel upstanding wings 12 and two top portions 13 turned inwardly from the top of the wings. The two wings are provided with peculiar shaped openings 14, hereinafter described in detail, which are occupied by the movable clamping member 30 which is preferably a cylindrical pin with enlarged heads 31 outside of the wings. The strap 20 is a comparatively thin, flexible, substantially non-stretchable member having strength and flexibility and being somewhat yielding transversely. I find it convenient to make the strap of canvass with a facing of rubber-like material, or it may be of leather or material having characteristics similar thereto.

The strap 20 occupies the housing and is held to the base 11 by an eyelet 25 which passes through the strap and through an opening 24 in the base and is below the strap, as shown in Figs. 5, 7, and 8. The eyelet also serves as a receptacle for the fastening screw. Such a screw is shown at A in Figs. 1 and 5, passing through the eyelet into a suitable support B. The upper portion of the eyelet preferably flares in a conical form as shown and thus is adapted to receive the head of a conventional countersinking screw with the top of the screw substantially flush with the top of the strap.

After the strap has been passed around the object to be clamped, as illustrated by the wires C in Fig. 1, the end of the strap is tucked under the top portion 13 of the housing and beneath the pin 30 and the strap drawn by its free end portion 22 through the housing until the loop portion 21 is tight about the object to be clamped. The forward end of the housing top 13 is bent downwardly and inwardly, as shown at 15 in Fig. 6 to allow a ready insertion and an easy travel of the strap through the housing.

The opening 14 through each side wing of the housing has its top edge inclining toward the front and downwardly toward the strap so that after the free end of the strap has been tucked beneath the retaining pin the forward movement of the retaining pin will clamp the free portion of the strap effectively against the retained portion beneath it as shown in Figs. 1 and 5.

It will be noticed, from Figs. 1 and 3, that the top portion 13 of the housing is cut away at the rear for a distance extending beyond the most forward portion of the pin. This cut away portion allows the free end of the strap to be doubled over toward the front above the pin and act on the pin to pull it forwardly. When the free end of the strap is first put in place in the housing, it occupies about the position shown in Fig. 8.

Then when its free end is swung forwardly over the pin, so that the pin lies in a bite of the strap, the mere forward pull on the free end of the strap will force the pin down into the forward parts of the openings 14 which by reason of the inclined tops of the openings clamp the pin in binding engagement with the strap, as shown in Fig. 5.

I have referrerd to the peculiar formation of the openings 14 in the two side wings 12 of the housing. This opening is somewhat larger than the enlarged heads 31 formed on opposite ends of the pin 30. Accordingly, the pin may be shoved into place through one of the openings when the strap is entirely absent, as shown in Fig. 6. Thereafter when the strap has been attached to the base by the eyelet 25, as shown in Fig. 7, the remaining space through the wings is reduced by the thickness of the strap, which leaves available space less than that required for the passage of either head 31, with the result that as soon as the strap is eyeleted to the base the pin is automatically locked in the retainer though free to move therein.

The rear edges of the openings 14 in the housing wings preferably incline rearwardly and upwardly from the base, as shown at 16 (Fig. 6) and then curve around toward the front in a more or less semi-circular course, producing a recess at the top, as shown at 17. From this recess the top edges continue as substantially straight inclined portions 18 for a distance and then reach slight upward curved portions 19, and finally turn downwardly at the front in substantially straight courses 26.

When the free end portion 22 of the strap is passed beneath the curved guide 15 and beneath the clamping pin 30 and the extreme free end of the strap is looped to the front over the pin and pulled forwardly into the recess provided by the cut-away top portions 13, the pin, which was lying substantially in the topmost portions 17 of the openings 14, is forced forwardly and passes downwardly along the inclines 18 thus binding the strap and compressing it beneath the pin. This fastening pull of the free end of the strap is continued until the pin comes beneath the recesses 19, whereupon the elasticity of the strap causes the pin to spring up into the recess and thereby holds the device in clamped position without danger of inadvertent loosening.

When it is desired to release the strap it is only necessary for the operator to take hold of the two heads on the pin with his thumb and first finger and give it a vigorous pull toward the rear, thus releasing the free end of the strap.

It will be seen that my device is extremely simple in construction, may be cheaply made and readily attached to the support. When attached the wires or other object to be held may be embraced and clamped with extreme rapidity, and when in place the clamping pin retains itself in position and holds itself locked, but, on the other hand, whenever it is necessary to release the object clamped this may be done in the minimum of time by simply pulling back the retaining pin into the larger portion of the openings into the housing and drawing the strap out of the retainer. This provision for speed in effecting the clamping action, and in releasing the object clamped, is of great value in various installations among which may be mentioned the clamping of electric wires in airplane work which in use require frequent changing.

I claim:

1. A clamping device comprising a housing having a base and a pair of side wings, a strap resting against the base between the side wings, the side wings having slots which extend upwardly above the strap, also downwardly along the side edges of the strap, the upper edge of the slots being inclined downwardly toward the strap, and a headed pin occupying the slots, the said downward incline at the upper edge of the slot extending for a sufficient distance to cause the pin to bind a return portion of the strap against the portion resting on the base the heads on the pin being larger than the available space in the slots when the strap is within the housing and lies on the base between the wings but smaller than the available space before the strip is in place, whereby one of the heads may be passed through the slots to mount the pin, the pin being thereafter automatically retained in place when the strap is mounted in the housing.

2. A clamping device comprising a flexible strap, a sheet metal housing having a base portion, a pair of upstanding wings and a top, the forward edge of the top being curled downwardly to form a guide, the wings having slots through them, the upper edges of which slots are inclined downwardly and forwardly toward the base, a headed pin occupying the slots, said downward incline continuing for a sufficient distance to cause the pin to bind the strap the rear portion of the top being omitted to provide an open space above the pin, and an eyelet open from end to end securing the strap to the base in a position beneath such open space, whereby a screw placed in the eyelet is accessible for turning into a support beneath the base.

3. A clamping device comprising a flexible strap, a housing formed of a single piece of sheet material extending in different directions to provide a base and a pair of upstanding wings, the strap having an end portion between the wings resting on the base, the wings having slots, and a clamping member in the form of a pin extending across the housing and occupying the slots and having heads beyond the wings, the upper edge of the slots forming camming guides, which lead in an inclined direction toward the base and toward the front end of the housing from which the strap passes, whereby forward movement of the pin will cam it downwardly toward the base, the said inclined direction continuing downwardly for a sufficient extent to enable the pin to bind a return portion of the strap which may enter the same end of the housing and lie beneath the pin and over the said end portion of the strap, and means entirely back of the clamping region securing the strap to the base to leave the upper surface of the secured portion of the strap free for engaging the return portion of the strap throughout the length and width of the clamping region.

4. A clamping device for a flexible strap, comprising a housing, said housing having a base and upstanding wings, with the tops of the wings extending over to form a top for the housing, slots in the wings having upper edges inclining downwardly toward one end of the base, and a clamping pin occupying the slots and having heads on the outer sides of the wings, the slots extending a sufficient distance above the base that a strap lying on the base may have a return portion of the strap passed under the top of the housing and beneath the pin, said top of the housing extending downwardly at said end of the base to provide a guide for such return portion of the strap, said top being cut away above the pin to provide a space for manipulating the return portion of the strap forwardly to draw the pin forwardly and downwardly along the upper edge of the slot into the clamping position.

5. A clamping device comprising a housing having a base and a pair of upstanding wings on opposite sides of the base, the wings having guides inclining toward the base, a clamping pin slidably occupying the housing and bearing against the guides, the pin being adapted to be cammed thereby toward the base for a sufficient distance to clamp the strap when the pin is moved forwardly, the said housing having a top portion carried by said upstanding wings, the front edge of said top portion forming a guide while leaving behind it an open space between the wings above the pin, and a strap secured to the base and extending along it and leaving the housing at the front end, whereby a return portion of the strap passed beneath the pin may be bent into U-shape across the rear of the pin and into the open top of the housing and thus serve to pull the pin forwardly into clamping position to bind the return portion of the strap against the outgoing portion.

GEORGE A. TINNERMAN.

REFERENCES CITED

The following references are of record in the file of this patent:

UNITED STATES PATENTS

| Number | Name | Date |
| --- | --- | --- |
| 148,444 | Goldsmith | Mar. 10, 1874 |
| 299,540 | Herkimer | June 3, 1884 |
| 331,088 | Sackett | Nov. 24, 1885 |
| 711,768 | Hughes | Oct. 21, 1902 |
| 855,675 | Skinner et al. | June 4, 1907 |
| 1,099,836 | Rumble | June 9, 1914 |
| 1,330,523 | Evitts et al. | Feb. 10, 1920 |
| 1,344,955 | Morse | June 29, 1920 |
| 1,440,399 | Maltby | Jan. 2, 1923 |
| 2,345,279 | Morehouse | Mar. 28, 1944 |